United States Patent [19]

Johnson

[11] Patent Number: 5,306,676
[45] Date of Patent: Apr. 26, 1994

[54] SILICON CARBIDE BODIES AND METHODS OF MAKING THE SAME

[75] Inventor: William B. Johnson, Newark, Del.

[73] Assignee: Lanxide Technology Company, LP, Newark, Del.

[21] Appl. No.: 28,455

[22] Filed: Mar. 9, 1993

[51] Int. Cl.$^5$ .................... C04B 35/56; C04B 35/65
[52] U.S. Cl. ..................... 501/88; 264/29.6; 264/65
[58] Field of Search .............. 501/88; 264/29.6, 65

[56] References Cited

U.S. PATENT DOCUMENTS

| | | | |
|---|---|---|---|
| 1,362,237 | 12/1920 | Ros | 423/610 OR |
| 2,741,822 | 4/1956 | Udy | 25/157 |
| 3,255,027 | 6/1966 | Talsma | 264/65 |
| 3,262,763 | 7/1966 | Bechtold | 501/984 |
| 3,296,002 | 1/1967 | Hare | 501/80 |
| 3,298,842 | 1/1967 | Seufert | 501/127 |
| 3,419,404 | 12/1968 | Mao | 501/984 |
| 3,421,863 | 1/1969 | Bawa | 501/128 |
| 3,437,468 | 4/1969 | Seufert | 75/235 |
| 3,473,938 | 10/1969 | Oberlin | 264/65 |
| 3,473,987 | 10/1969 | Sowards | 501/119 |
| 3,538,231 | 11/1970 | Newkirk | 373/117 |
| 3,551,101 | 12/1970 | Matsuo | 423/412 OR |
| 3,692,474 | 9/1972 | Arber | 423/411 X |
| 3,789,096 | 1/1974 | Church et al. | 264/60 |
| 3,864,154 | 2/1975 | Gazza et al. | 29/123 |
| 3,973,977 | 8/1976 | Wilson | 501/120 |
| 4,117,096 | 7/1978 | Hosaka et al. | 501/884 |
| 4,851,375 | 7/1989 | Newkirk et al. | 501/88 |
| 4,923,832 | 5/1990 | Newkirk et al. | 501/128 |
| 5,205,970 | 4/1993 | Brun et al. | 501/88 X |

FOREIGN PATENT DOCUMENTS

| | | | |
|---|---|---|---|
| 0116809 | 8/1984 | European Pat. Off. | |
| 0155831 | 9/1985 | European Pat. Off. | |
| 0127208 | 7/1985 | Japan | 423/412 |
| 1011527 | 4/1983 | U.S.S.R. | 423/618 |
| 0896766 | 5/1962 | United Kingdom | 423/412 |
| 2127709 | 4/1984 | United Kingdom | 423/412 |

OTHER PUBLICATIONS

Drouzy et al. "Oxidation of Molten Aluminum Alloys", Reaction with Refractories, France, vol. 29, No. 332, pp. 121-128, Mar. 1974.

Clavaud et al., "Refractories for Aluminum Alloy Melting Furnaces," Sep. 25 & 26, 1980.

Moskovits, "The Kinetics of Oxidation of Molten Aluminum in Oxidation Streams", Oxidation of Metals, vol. 5, No. 1 (1972).

*Primary Examiner*—Karl Group
*Attorney, Agent, or Firm*—Mark G. Mortenson; Kevin J. Boland

[57] ABSTRACT

This invention broadly relates to methods for producing self-supporting silicon carbide and silicon carbide composite bodies. More particularly, this invention relates to silicon carbide and silicon carbide composites, grown by the oxidation reaction of a silicon metal with a gas comprising at least one gas selected from the group consisting of fluorinated hydrocarbon gases, chlorohydrocarbon gases, and chlorofluorocarbon gases.

16 Claims, 2 Drawing Sheets

SILICON CARBIDE BODIES AND METHODS OF MAKING THE SAME

FIELD OF THE INVENTION

This invention broadly relates to methods for producing self-supporting silicon carbide and silicon carbide composite bodies. More particularly, this invention relates to silicon carbide and silicon carbide composites, grown by the oxidation reaction of a parent metal comprising silicon with a vapor-phase oxidant comprising a fluorinated hydrocarbon.

BACKGROUND OF THE INVENTION

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities when compared with metals, coupled with the fact that the engineering limits of performance of many modern components and systems are now gated by these properties in conventionally employed materials. Examples of areas for such prospective use include engine components, heat exchangers, cutting tools, bearings and wear surfaces, pumps, and marine hardware.

Current and past efforts at producing higher strength, more reliable, and tougher ceramic articles have largely focused upon (1) the development of improved processing methods for monolithic ceramics and (2) the development of ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse kinds of filler or preform materials such as particulates, fibers, rods or the like.

Many of the past difficulties in forming desirable materials have been overcome by the methods described in several commonly owned patents and copending patent applications. These commonly owned patents and patent applications are discussed below.

DESCRIPTION OF COMMONLY OWNED PATENTS AND PATENT APPLICATIONS

A method for producing ceramic composite bodies having a predetermined geometry or shape is disclosed in Commonly Owned U.S. Pat. No. 5,017,526 which issued May 21, 1991, which is a continuation of U.S. application Ser. No. 06/861,025, filed May 8, 1986 (and now abandoned), both in the names of Marc S. Newkirk et al., a European counterpart to which was published in the EPO on Jan. 22, 1986. In accordance with the method in this U.S. Patent, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/295,488, filed Jan. 10, 1989 (and now abandoned), which is a continuation of U.S. Pat. No. 4,923,832, which issued May 8, 1990, both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. patent application Ser. No. 07/329,794, filed Mar. 28, 1989 (and now U.S. Pat. No. 5,051,382, issued Sep. 24, 1991), which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

A method for tailoring the constituency of the metallic component of a ceramic matrix composite structure is disclosed in Copending and Commonly Owned U.S. Pat. No. 5,017,533, which issued on May 21, 1991, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby".

Moreover, U.S. patent application Ser. No. 07/269,152, filed Nov. 9, 1988 (and now abandoned), which is a continuation of U.S. patent application Ser. No. 07/152,518, (which issued as U.S. Pat. No. 4,818,734, on Apr. 4, 1989), in the names of Robert C. Kantner et al., which was a Continuation-in-Part Application of the above-mentioned Ser. No. 06/908,454, having the same title and also being Commonly Owned. This Patent, and the above-mentioned application Ser. No. 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by postforming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen (e.g., carbon) may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy, in the case of using oxygen as an oxidant, comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The entire disclosures of the above-described Commonly Owned Ceramic Matrix Patent Applications and Patents are expressly incorporated herein by reference.

SUMMARY OF THE INVENTION

As discussed above, a unique oxidation reaction product may be formed by reacting a molten parent metal with an oxidant to form an oxidation reaction product which may be grown to form a self-supporting ceramic or ceramic matrix composite body. Moreover, such bodies may be formed to net or near net shape by utilizing a barrier means. Furthermore, oxidants disclosed may be either gaseous, liquid, solid, or any combination thereof. Further, as discussed in the above Commonly Owned Ceramic Matrix Patent Applications and Patents, various parent metals and various oxidants may be used to form various oxidation reaction products.

Although several of the Commonly Owned Ceramic Matrix Patent Applications and Patents disclose that a silicon parent metal may be reacted with an oxidant such as a carbon-containing gas to form a silicon carbide oxidation reaction product, none of the above discussed Commonly Owned Ceramic Matrix Patent Applications and Patents expressly disclose that a carbon-containing gas comprising at least one of a fluorinated hydrocarbon ($C_zF_x$), a chlorohydrocarbon ($C_zCl_x$) and/or a chlorofluorocarbon ($C_zCl_xF_y$) could be used to form a silicon carbide oxidation reaction product. The particular gases may be desirable because of their common capability of favorably reacting with a parent metal comprising silicon to form a product comprising silicon carbide and because these gases do not decompose at the reaction temperatures of the invention to form undesirable amounts of, for example, solids comprising carbon (e.g., soot).

For example, U.S. Pat. No. 4,923,832 discloses that a parent metal may be reacted with a hydrocarbon gas as a source of carbon (e.g., to form a silicon carbide oxidation reaction product). However, this patent does not expressly disclose that a fluorinated hydrocarbon could be reacted with silicon parent metal to form a silicon carbide oxidation reaction product. The present invention is based upon the discovery that the use of the aforementioned gases in place of, for example, a hydrocarbon gas, may provide for improved growth rate of the oxidation reaction product.

More specifically, it has been determined that the reaction of a parent metal comprising silicon with, for example, a fluorinated hydrocarbon-containing gas at an appropriate reaction temperature is more thermodynamically favored as compared to the reaction of a parent metal comprising silicon with a hydrocarbon-containing gas at an appropriate reaction temperature; thus, providing a more efficient (i.e., more economical) process for forming self-supporting silicon carbide bodies.

DEFINITIONS

"Barrier" or "barrier means", as used herein, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1-40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Dopants", as used herein, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein, in conjunction with the composites referenced herein, means either single constituents or mixtures of constituents which are substantially non-reactive with and/or of limited solubility in the matrix and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fillers such as carbon fibers coated with alumina or silicon carbide to protect the carbon from attack, for example, by a molten aluminum parent metal. Fillers may also include metals. For example, refractory metals such as tungsten, tantalum and molybdenum could be used as fillers.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), fluorinated hydrocarbons (e.g., $CF_4$), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Parent Metal", as used herein, means that metal(s) (e.g., silicon) which is the precursor of a polycrystalline oxidation reaction product (e.g., carbides) and includes that metal(s) as an essentially pure metal, a commercially available metal having impurities and/or alloying constituents therein, or an alloy in which that metal precursor is the major constituent. When a specified metal is mentioned as the parent or precursor metal (e.g., silicon, etc.), the metal identified should be read with this definition in mind unless indicated otherwise by the context.

"Preform" or "Permeable Preform", as used herein, means a porous mass of filler or filler material which is manufactured with at least one surface boundary which essentially defines a boundary for infiltrating an appropriate oxidation reaction product, such mass retaining sufficient shape integrity and green strength to provide dimensional fidelity without any external means of support prior to being infiltrated by the oxidation reaction product. The mass should be sufficiently porous to permit infiltration of the oxidation reaction product. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Second or Foreign Metal", as used herein, means any suitable metal, combination of metals, alloys, intermetallic compounds, or sources of either, which is, or is desired to be, incorporated into the metallic component of a formed ceramic composite body in lieu of, in addition to, or in combination with unoxidized constituents of the parent metal. This definition includes intermetallic compounds, alloys, solid solutions or the like formed between the parent metal and a second metal.

DETAILED DESCRIPTION OF THE INVENTION

Figure 1:
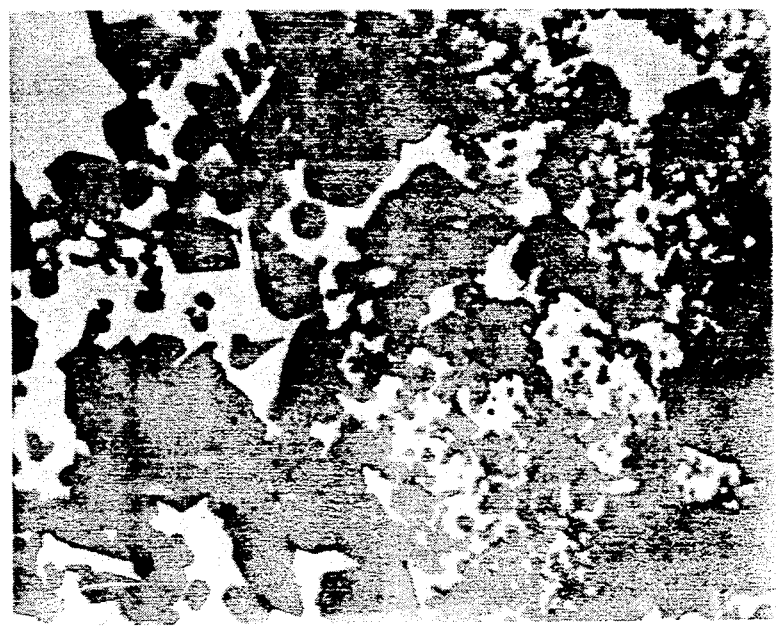
FIG. 1 is a photomicrograph taken at about 425X magnification of the oxidation reaction product formed in crucible 4 in Example 3.

As discussed above, it has been discovered that a unique oxidation reaction product may be formed by reacting a molten parent metal with an oxidant to form an oxidation reaction product which may be grown to form a self-supporting ceramic or ceramic matrix composite body. Moreover, such bodies may be formed to net or near net shape by utilizing a barrier means. Furthermore, oxidants disclosed may be either gaseous, liquid, solid, or any combination thereof. Further, as discussed in the above Commonly Owned Ceramic Matrix Patent Applications and Patents, various parent metals and various oxidants may be used to form the oxidation reaction product.

Although several of the Commonly Owned Ceramic Matrix Patent Applications and Patents may disclose that a silicon parent metal may be reacted with an oxidant such as a carbon-containing gas to form a silicon carbide oxidation reaction product, none of the above discussed commonly owned patent applications and patents expressly disclose that a carbon-containing gas comprising a fluorinated hydrocarbon gas could be used to form a silicon carbide oxidation reaction product.

For example, U.S. Pat. No. 4,923,832 discloses that a parent metal may be reacted with a hydrocarbon gas as a source of carbon (e.g., to form a silicon carbide oxidation reaction product). However, this patent does not expressly disclose that a fluorinated hydrocarbon could be reacted with silicon parent metal to form a silicon carbide oxidation reaction product. The present invention is based upon the discovery that the use of a fluorinated hydrocarbon gas in place of, for example, a hydrocarbon gas, may provide for improved growth rate of the oxidation reaction product.

More specifically, it has been determined that the reaction of a parent metal comprising silicon with, for example, a fluorinated hydrocarbon-containing gas at an appropriate reaction temperature is more thermodynamically favored as compared to the reaction of a parent metal comprising silicon with a hydrocarbon-containing gas at an appropriate reaction temperature; thus, providing a more efficient (i.e., more economical) process for forming self-supporting silicon carbide bodies.

Without wishing to be bound by any particular theory or explanation, it appears as though, for example, a hydrocarbon (e.g., methane) can function as a carbon-containing gas (e.g., an oxidant of carbon) for formation of large silicon carbide bodies, however, the use of one or more hydrocarbon vapor-phase oxidants may be important because hydrocarbon gases (e.g., methane) decompose above the melting temperature of silicon (e.g., about 1410° C.), where the oxidation reaction occurs. Specifically, the methane decomposes to a solid carbon and gaseous hydrogen. Several problems may be realized due to this decomposition. First, for example, a large quantity of methane gas may be required to form large silicon carbide bodies because only a very small fraction of the gas is present as the gaseous oxidant (e.g., when methane is used, the chemical formulation of methane ($CH_4$) results in more hydrogen than carbon per molecule of methane. Moreover, thermodynamic calculations show that at about 1427° C., only about 0.2% of the $CH_4$ remains present as $CH_4$; the balance is present as a carbonaceous solid and gaseous hydrogen. Therefore, relatively large quantities of methane gas would be required to form even relatively small silicon carbide bodies.

The present invention is based upon the discovery that a fluorinated hydrocarbon-containing gas may be a more favorable gaseous carbon source because such gas is relatively stable at the reaction temperatures of the invention. A particularly preferred fluorinated hydrocarbon is $CF_4$. It has been discovered that fluorinated hydrocarbons such as $CF_4$ do not decompose substantially below about 2000° C. Thus, one skilled in the art will appreciate that such fluorinated hydrocarbons may be more suitable for the formation of large silicon carbide bodies through the oxidation reaction process.

Furthermore, it is possible to grow the silicon carbide oxidation reaction product into a permeable mass of filler material or preform. Moreover, use of a barrier material to provide for the formation of net or near-net shape composite bodies is also possible. Furthermore, the use of dopant materials such as, for example, iron, manganese and calcium may have a beneficial effect upon the initiation and growth rates of the oxidation reaction product.

Various demonstrations of the present invention are included in the Examples immediately following. However, these Examples should be considered as being illustrative and should not be construed as limiting the scope of the invention as defined in the appended claims.

EXAMPLE 1

This Example demonstrates a method for forming a silicon carbide oxidation reaction product by reacting a molten parent metal comprising silicon with a gas comprising $CF_4$.

Four small graphite crucibles were prepared by placing an amount of crushed silicon parent metal into each graphite crucible. Specifically, a first graphite crucible having a weight of about 4.39674 grams was prepared by placing about 4.47558 grams of 99.9995% pure crushed silicon parent metal into the crucible. A second graphite crucible weighing about 4.80574 grams was prepared by placing about 4.34265 grams of metallurgical grade crushed silicon parent metal (which comprised by weight about 0.5% iron, balance silicon) into the crucible. A third graphite crucible weighing about 4.41482 grams was prepared by placing about 4.66407 grams of 99.9995% purity crushed silicon parent metal into the crucible. Finally, a fourth graphite crucible weighing about 4.72616 grams was prepared by placing about 4.65909 grams of metallurgical grade crushed silicon parent metal into the crucible.

All four graphite crucibles containing the crushed silicon parent metal were placed into a single, larger graphite crucible. The larger graphite crucible and its contents was placed into a vacuum furnace.

The furnace was evacuated to about 30 inches of mercury vacuum and backfilled with argon gas to about atmospheric pressure. The furnace was again evacuated to about 30 inches of mercury vacuum and backfilled with argon gas to a pressure of about 730 Torr. An argon gas flow rate of about 0.1 liters per minute was established through the furnace and the furnace was raised from about room temperature to about 1750° C. in about 20 minutes.

Upon reaching a furnace temperature of about 1750° C., the argon gas flow rate was interrupted completely and a Freon ® 14 carbontetrafluoride (purchased from Scott Specialty Gases, Plumsteadville, Pa.) gas flow rate of about 50 standard cubic centimeters per minute was established. After maintaining a temperature of about 1750° C. and a $CF_4$ gas flow rate of about 50 standard cubic centimeters per minute for about 12 hours, the furnace was allowed to cool to room temperature.

After reaching room temperature, the graphite crucible and its contents was removed from the furnace and it was noted that crucibles 1 and 3 were empty; however, some silicon had reacted with the graphite crucibles to form silicon carbide. Crucibles 2 and 4 contained some unreacted silicon parent metal and also silicon carbide oxidation reaction product.

The silicon carbide oxidation reaction product from crucibles 2 and 4 was analyzed by x-ray diffraction. Specifically, each sample was ground to powder form using a mortar and pestle and then passed through a 400 mesh screen. The powdered samples were placed into the sample chamber of a diffractometer (Model D5000, Siemens AG, Munich, Germany) and scanned with unfiltered $Cu_{K\alpha}$ x-radiation at an energy of 40 Kev. The counting time was about one second at each 0.05 degree interval of two-theta. The sample from crucible 2 was comprised of essentially SiC. The sample from crucible 4 was comprised of essentially SiC, with a minor amount of carbon present.

EXAMPLE 2

This Example further demonstrates a method for forming a silicon carbide oxidation reaction product by reacting a molten silicon parent metal comprising silicon with a gas comprising $CF_4$.

Four small graphite crucibles were prepared by placing an amount of crushed silicon parent metal into each graphite crucible. Specifically, a first graphite crucible having a weight of about 4.57638 grams was prepared by placing about 4.74482 grams of 99.9995% pure crushed silicon parent metal into the crucible. A second graphite crucible weighing about 4.54305 grams was prepared by placing about 3.90319 grams of metallurgical grade crushed silicon parent metal (which comprised by weight about 0.5% iron, balance silicon) into the crucible. A third graphite crucible weighing about 4.56564 grams was prepared by placing about 4.94504 grams of 99.9995% purity crushed silicon parent metal into the crucible. Finally, a fourth graphite crucible weighing about 4.63384 grams was prepared by placing about 4.49412 grams of metallurgical grade crushed silicon parent metal into the crucible.

All four graphite crucibles containing the crushed silicon parent metal were placed into a single, larger graphite crucible. The larger graphite crucible and its contents was placed into a vacuum furnace.

The furnace was evacuated to about 30 inches of mercury vacuum and backfilled with argon gas to about atmospheric pressure. The furnace was again evacuated to about 30 inches of mercury vacuum and backfilled with argon gas to a pressure of about 730 Torr. An argon gas flow rate of about 0.1 liters per minute was established through the furnace and the furnace was raised from about room temperature to about 1500° C. in about 20 minutes.

Upon reaching a furnace temperature of about 1500° C., the argon gas flow rate was interrupted completely and a Freon ® 14 carbontetrafluoride (purchased from Scott Specialty Gases, Plumsteadville, Pa.) gas flow rate of about 50 standard cubic centimeters per minute was established. After maintaining a temperature of about 1500° C. and a $CF_4$ gas flow rate of about 50 standard cubic centimeters per minute for about 12 hours, the furnace was allowed to cool to room temperature.

After reaching room temperature, the graphite crucible and its contents was removed from the furnace and it was noted that crucibles 1 and 3 were empty; however, some silicon had reacted with the graphite crucibles to form silicon carbide. Crucible 2 was empty, but some silicon carbide oxidation reaction product had formed in the form of whiskers. Additionally, some silicon had reacted with the graphite crucible to form silicon carbide. Finally, crucible 4 contained some unreacted silicon parent metal and minor amounts of silicon carbide oxidation reaction product.

The silicon carbide oxidation reaction product from crucible 2 was analyzed by x-ray diffraction, using the same techniques and parameters of Example 1, showing the sample to be comprised of essentially SiC with minor amounts of carbon present.

EXAMPLE 3

This Example demonstrates the use of iron added as a dopant material in conjunction with silicon to form a silicon carbide oxidation reaction product by reacting molten parent metal comprising silicon and containing iron with a gas comprising $CF_4$.

Four small graphite crucibles were prepared by placing an amount of crushed silicon parent metal into each graphite crucible. Specifically, a first graphite crucible having a weight of about 4.60546 grams was prepared by placing about 4.82800 grams of 99.9995% pure crushed silicon parent metal into the crucible. A second graphite crucible weighing about 4.61626 grams was prepared by placing about 4.55356 grams of 99.9995% pure crushed silicon parent metal and about 0.04544 gram of iron powder into the crucible. A third graphite crucible weighing about 4.54282 grams was prepared by placing about 4.49369 grams of 99.9995% purity crushed silicon parent metal and about 0.21893 gram of iron powder into the crucible. Finally, a fourth graphite crucible weighing about 4.77138 grams was prepared by placing about 4.80226 grams of 99.9995% pure crushed silicon parent metal and about 0.42760 gram of iron powder into the crucible.

All four graphite crucibles were placed into a single, larger graphite crucible. The larger graphite crucible and its contents was placed into a vacuum furnace.

The furnace was evacuated to about 30 inches of mercury vacuum and backfilled with argon gas to about atmospheric pressure. The furnace was again evacuated to about 30 inches of mercury vacuum and backfilled with argon gas to a pressure of about 730 Torr. An argon gas flow rate of about 0.1 liters per minute was established through the furnace and the furnace was raised from about room temperature to about 1750° C. in about 20 minutes.

Upon reaching a furnace temperature of about 1750° C., the argon gas flow rate was interrupted completely and a Freon ® 14 carbontetrafluoride (purchased from Scott Specialty Gases, Plumsteadville, Pa.) gas flow rate of about 50 standard cubic centimeters per minute was established. After maintaining a temperature of about 1750° C. and a $CF_4$ gas flow rate of about 50 standard cubic centimeters per minute for about 12 hours, the furnace was allowed to cool to room temperature.

After reaching room temperature, the graphite crucible and its contents was removed from the furnace and it was noted that crucibles 1 and 2 were empty; however, some silicon had reacted with the graphite crucible to form silicon carbide. Crucible 3 was empty; however, some silicon had reacted to form some silicon carbide oxidation reaction product and some silicon had reacted with the graphite crucible to form silicon carbide. Crucible 4 contained some unreacted silicon parent metal and also silicon carbide oxidation reaction product.

FIG. 1, is a photomicrograph of the oxidation reaction product formed in crucible 4, taken at about 425X magnification.

EXAMPLE 4

This Example demonstrates the use of manganese as a dopant material in conjunction with silicon to form a silicon carbide oxidation reaction product by reacting a molten parent metal comprising silicon and containing some manganese with a gas comprising $CF_4$.

Four small graphite crucibles were prepared by placing an amount of crushed silicon parent metal into each graphite crucible. Specifically, a first graphite crucible having a weight of about 4.55327 grams was prepared by placing about 4.52016 grams of 99.9995% pure crushed silicon parent metal into the crucible. A second graphite crucible weighing about 4.74257 grams was prepared by placing about 4.91163 grams of 99.9995% pure crushed silicon parent metal and about 0.04953 gram of manganese powder into the crucible. A third graphite crucible weighing about 4.49413 grams was prepared by placing about 4.67078 grams of 99.9995% purity crushed silicon parent metal and about 0.24854 gram of manganese powder into the crucible. Finally, a fourth graphite crucible weighing about 4.64773 grams was prepared by placing about 4.64019 grams of 99.9995% pure crushed silicon parent metal and about 0.51534 gram of manganese powder into the crucible.

All four graphite crucibles were placed into a single, larger graphite crucible. The larger graphite crucible and its contents was placed into a vacuum furnace.

The furnace was evacuated to about 30 inches of mercury vacuum and backfilled with argon gas to about atmospheric pressure. The furnace was again evacuated to about 30 inches of mercury vacuum and backfilled with argon gas to a pressure of about 730 Torr. An argon gas flow rate of about 0.1 liters per minute was established through the furnace and the furnace was raised from about room temperature to about 1750° C. in about 20 minutes.

Upon reaching a furnace temperature of about 1750° C., the argon gas flow rate was interrupted completely and a Freon ® 14 carbontetrafluoride (purchased from Scott Specialty Gases, Plumsteadville, Pa.) gas flow rate of about 50 standard cubic centimeters per minute was established. After maintaining a temperature of about 1750° C. and a $CF_4$ gas flow rate of about 50 standard cubic centimeters per minute for about 12 hours, the furnace was allowed to cool to room temperature.

After reaching room temperature, the graphite crucible and its contents was removed from the furnace and it was noted that crucible 1 was empty; however, some silicon had reacted with the graphite crucible to form silicon carbide. Crucible 2 contained some unreacted silicon parent metal and some silicon had reacted with the graphite crucible to form silicon carbide. Crucibles 3 and 4 contained some unreacted silicon parent metal and also silicon carbide oxidation reaction product.

Figure 2:
FIG. 2 is a photomicrograph taken at about 100X magnification of the oxidation reaction product formed in crucible 3 in Example 4.
Figure 3:
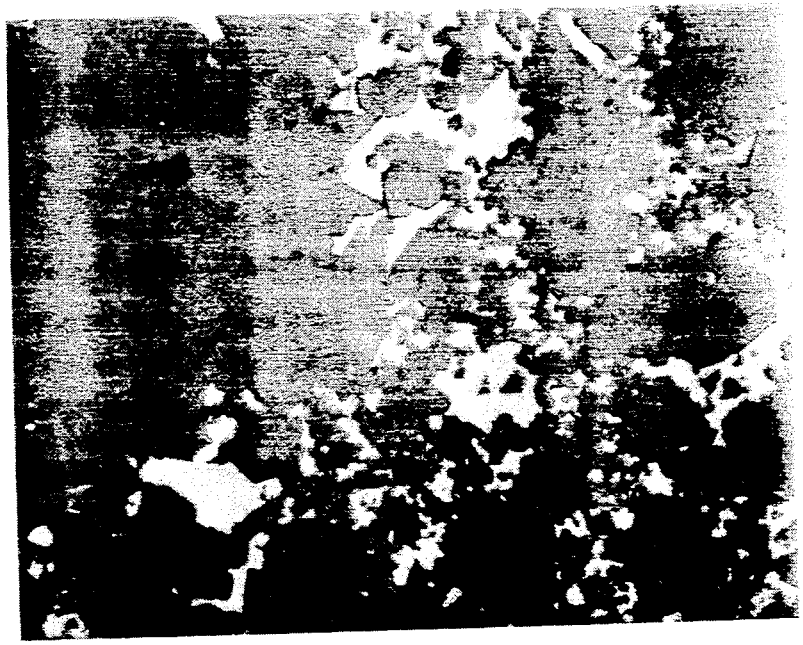
FIG. 3 is a photomicrograph taken at about 425X magnification of the oxidation reaction product formed in crucible 3 in Example 4.

FIGS. 2 and 3 are photomicrographs of the oxidation reaction product formed in crucible 3, taken at 100X and 425X magnification, respectively.

What is claimed is:

1. A method for producing a self-supporting ceramic body by oxidation of a parent metal comprising silicon to form a polycrystalline material comprising (1) the oxidation reaction product of said parent metal with a vapor-phase oxidant comprising carbon, and (2) one or more non-oxidized constituents of the parent metal, comprising the steps of:

(a) heating said parent metal comprising silicon to a temperature above the melting point of said parent metal, but below the melting point of its oxidation reaction product;

(b) reacting said parent metal with a vapor-phase oxidant comprising at least one gas selected from the group consisting of fluorinated hydrocarbon gases, chlorohydrocarbon gases and chlorofluorocarbon gases to form an oxidation reaction product comprising silicon carbide;

(c) maintaining at least a portion of said oxidation reaction product in contact with and between said body of parent metal and said oxidant, to draw molten metal through the oxidation reaction product towards the oxidant so that fresh oxidation reaction product continues to form at the interface between the oxidant and previously formed oxidation reaction product; and (d) continuing said reaction for a time sufficient to produce said self-supporting ceramic body.

2. The method of claim 1, wherein one or more dopants are used in conjunction with said parent metal.

3. The method of claim 2, wherein said dopants comprise one or more materials selected from the group consisting of iron, manganese, and calcium.

4. A method for producing a self-supporting ceramic body by oxidation of a parent metal comprising silicon to form a polycrystalline material comprising the oxidation reaction product of said parent metal with a vapor-phase oxidant comprising carbon, said method comprising the steps of: (a) providing at least a portion of said parent metal with a barrier means at least partially spaced from said parent metal for establishing at least one surface of the ceramic body; (b) heating said parent metal to a temperature above its melting point but below the melting point of its oxidation reaction product to form a body of molten metal; (c) reacting said molten parent metal at said temperature with said vapor-phase oxidant comprising at least one gas selected from the group consisting of fluorinated hydrocarbon gases, chlorohydrocarbon gases, and chlorofluorocarbon gases to form an oxidation reaction product comprising silicon carbide; (d) maintaining at least a portion of said oxidation reaction product in contact with and between said molten parent metal and said oxidant, to transport molten parent metal through the oxidation reaction product towards said barrier means and into contact with said oxidant so that fresh oxidation reaction product continues to form at an interface between the oxidant and previously formed oxidation reaction product; and, (e) continuing said reaction until said oxidation reaction product contacts said barrier means to produce said ceramic body having said surface established by said barrier means.

5. A method for producing a self-supporting ceramic composite structure comprising a mass of filler material infiltrated by a ceramic matrix obtained by the oxidation of a parent metal comprising silicon to form a polycrystalline material, said polycrystalline material comprising the oxidation reaction product of said parent metal with a vapor-phase oxidant comprising carbon, said method comprising the steps of: (a) heating said parent metal to a temperature above its melting point but below the melting point of its oxidation reaction product to form a body of molten parent metal; (b) contacting a zone of said mass of filler material with said body of molten parent metal, said mass of filler material having at least one surface defined by a barrier means at least partially spaced from said contacting zone such that formation of said oxidation reaction product will occur into said mass of filler material and in a direction toward said barrier means; (c) reacting said molten parent metal at said temperature with said oxidant comprising at least one gas selected from the group consisting of fluorinated hydrocarbon gases, chlorohydrocarbon gases, and chlorofluorocarbon gases to form an oxidation reaction product; (d) maintaining at least a portion of said oxidation reaction product in contact with and between said molten parent metal and said oxidant, to progressively transport molten parent metal through the oxidation reaction product toward the oxidant so that fresh oxidation reaction product continues to form at an interface between said oxidant and previously formed oxidation reaction product that has infiltrated said mass of filler material; and (e) continuing said reaction until said oxidation reaction product contacts said barrier means to produce said ceramic composite structure having said surface established by said barrier means.

6. The method of claim 1, wherein said fluorinated hydrocarbon gas comprises carbontetrafluoride.

7. The method of claim 4, wherein said fluorinated hydrocarbon gas comprises carbontetrafluoride.

8. The method of claim 5, wherein said fluorinated hydrocarbon gas comprises carbontetrafluoride.

9. The method of claim 4, wherein one or more dopants are used in conjunction with said parent metal.

10. The method of claim 9, wherein said dopants comprise one or more materials selected from the group consisting of iron, manganese, and calcium.

11. The method of claim 5, wherein one or more dopants are used in conjunction with said parent metal.

12. The method of claim 11, wherein said dopants comprise one or more materials selected from the group consisting of iron, manganese, and calcium.

13. The method of claim 3, wherein said dopants comprise one or more materials selected from the group consisting of iron and manganese.

14. The method of claim 10, wherein said dopants comprise one or more materials selected from the group consisting of iron and manganese.

15. The method of claim 12, wherein said dopants comprise one or more materials selected from the group consisting of iron and manganese.

16. The method of claim 5, wherein said mass of filler material comprises a preform.

* * * * *